United States Patent
Fritz et al.

[11] Patent Number: 5,941,561
[45] Date of Patent: Aug. 24, 1999

[54] APPARATUS FOR THE QUICK INFLATION OF AN AIRBAG

[75] Inventors: Raimund Fritz, Trossingen; Marcus Metzger, Baden-Baden; Elke Bach, Oberndorf/Neckar; Roland Huber, Schramberg; Klaus Sütterlin, Teningen/Köndringen, all of Germany

[73] Assignee: TRW Automotive Safety Systems GmbH, Aschaffenburg, Germany

[21] Appl. No.: 08/768,598

[22] Filed: Dec. 18, 1996

[30] Foreign Application Priority Data

Dec. 23, 1995 [DE] Germany ............... 195 48 571

[51] Int. Cl.⁶ ................................................. B60R 21/26
[52] U.S. Cl. ............................................ 280/736; 280/742
[58] Field of Search ........................... 280/736, 742, 280/728.1, 740

[56] References Cited

U.S. PATENT DOCUMENTS 5,242,194  9/1993  Popek .................................. 280/737

FOREIGN PATENT DOCUMENTS 0554919  1/1991  European Pat. Off. .
0464189  8/1992  European Pat. Off. .
0639483  2/1995  European Pat. Off. .
2339605  1/1997  Germany .

Primary Examiner—J. Woodrow Eldred
Attorney, Agent, or Firm—Sprung Kramer Schaefer & Briscoe

[57] ABSTRACT

An apparatus for the quick inflation of an airbag has a compressed-gas tank and a propellant charge container having pyrotechnical contents which form a propellant gas upon ignition. A breakaway disk blocks passage of compressed-gas and propellant gas to the airbag and is blown off in response to the ignition of the pyrotechnical contents to unblock the passages. The breakaway disk has an opening through which the propellant gas can flow into the airbag immediately after the ignition and before the breakaway disk is blown off.

8 Claims, 1 Drawing Sheet

APPARATUS FOR THE QUICK INFLATION OF AN AIRBAG

The invention relates to an apparatus for the quick inflation of an airbag, having a compressed-gas container and a propellant charge container whose pyrotechnical content forms a propellant gas upon ignition, as well as having a breakaway disk which can be blown off when the propellant charge ignites and which upon being blown off opens up the entire cross section between the compressed-gas container and the propellant charge container.

Such apparatus are disclosed in EP 04 64 189 B1 and EP 05 54 919 B1. The breakaway disk has one or more breakaway scores whose strength is made such that first a certain minimum pressure must build up before the breakaway disk releases the cross section of the entry to the airbag and the latter can be inflated. For airbags which are provided for the protection of persons in the steering wheel or in the instrument panel, these apparatus have proven valuable, because due to the comparatively great distance between the point of installation and the person the airbag can be fully inflated before the person is caught by it. In other words, the time elapsing between the generation of a triggering signal and the contact between the person and the airbag is great enough to fire the propellant charge, produce the propellant gas, and feed it into the airbag. Time spans of 30 to 40 milliseconds are generally reckoned for this process. Such time spans however are too long if an airbag has to be filled much faster, as for example in the case of a side airbag. For these cases only 8 to 12 ms is available for the entire process. The problem thus exists of further developing the known, generic apparatus such that very short inflation times can also be achieved.

To solve this problem it is proposed according to the invention that the breakaway disk have an opening through which the propellant gas can flow immediately after ignition and before the breakaway disk can flow into the airbag.

The opening in the breakaway disk is, of course, disposed so that the compressed-gas tank remains tightly closed until the breakaway disk is blown off, and a connection is made only between the propellant gas container and the entry cross section of the airbag. The propellant gases forming after the ignition can thus enter the airbag before the breakaway disk is blown off and initiate the inflation. Naturally, this initial inflation effect is affected by the size of the opening provided in the breakaway disk according to the invention, and this also enables the total inflation time to be controlled by it. In addition to the advantage of an abbreviated inflation time, it is also very simply possible to adapt the apparatus to different requirements as regards inflation time.

Furthermore, the opening in the breakaway disk brings it about that the initial pressure of the propellant gas is not to the full extent opposed to the compressed-gas that flows out after the breakaway disk breaks, which in conventional apparatus involves a considerable delaying effect on the inflation of the airbag.

Practical embodiments of the idea of the invention include providing a choke disk between the propellant charge container and the breakaway disk which can move toward the breakaway disk and by means of which the breaking off of the breakaway disk is brought about mechanically, the choke disk being of hat-shaped cross section and its movement toward the breakaway disk is limited by an abutment acting on the choke disk on its brim end, the propellant charge container being disposed together with an igniter, the breakaway disk and the choke disk in a common housing, the abutment forming part of the housing, and the compressed-gas tank being fastened to the housing and being connected to the gas chamber in the housing by at least one port which is closed hermetically by the breakaway disk, the breakaway disk consisting integrally of a flat cover portion and a tubular stem and connecting with the housing both at the margin by the cover portion and at the end by the stem, the breakaway disk having an annular score both in the cover portion and in the tubular stem, the housing being provided with a gas outlet which serves simultaneously as an abutment for the broken breakaway disk and the opening in the breakaway disk being disposed centrally and its size being the means of controlling the initial flow of the propellant gas into the airbag.

Further details and advantages are explained with the aid of the drawing, wherein:

BRIEF DESCRIPTION OF THE DRAWING

The FIGURE is a partial sectional view of an apparatus according to the invention.

DETAILED DESCRIPTION OF THE INVENTION

Figure 1:
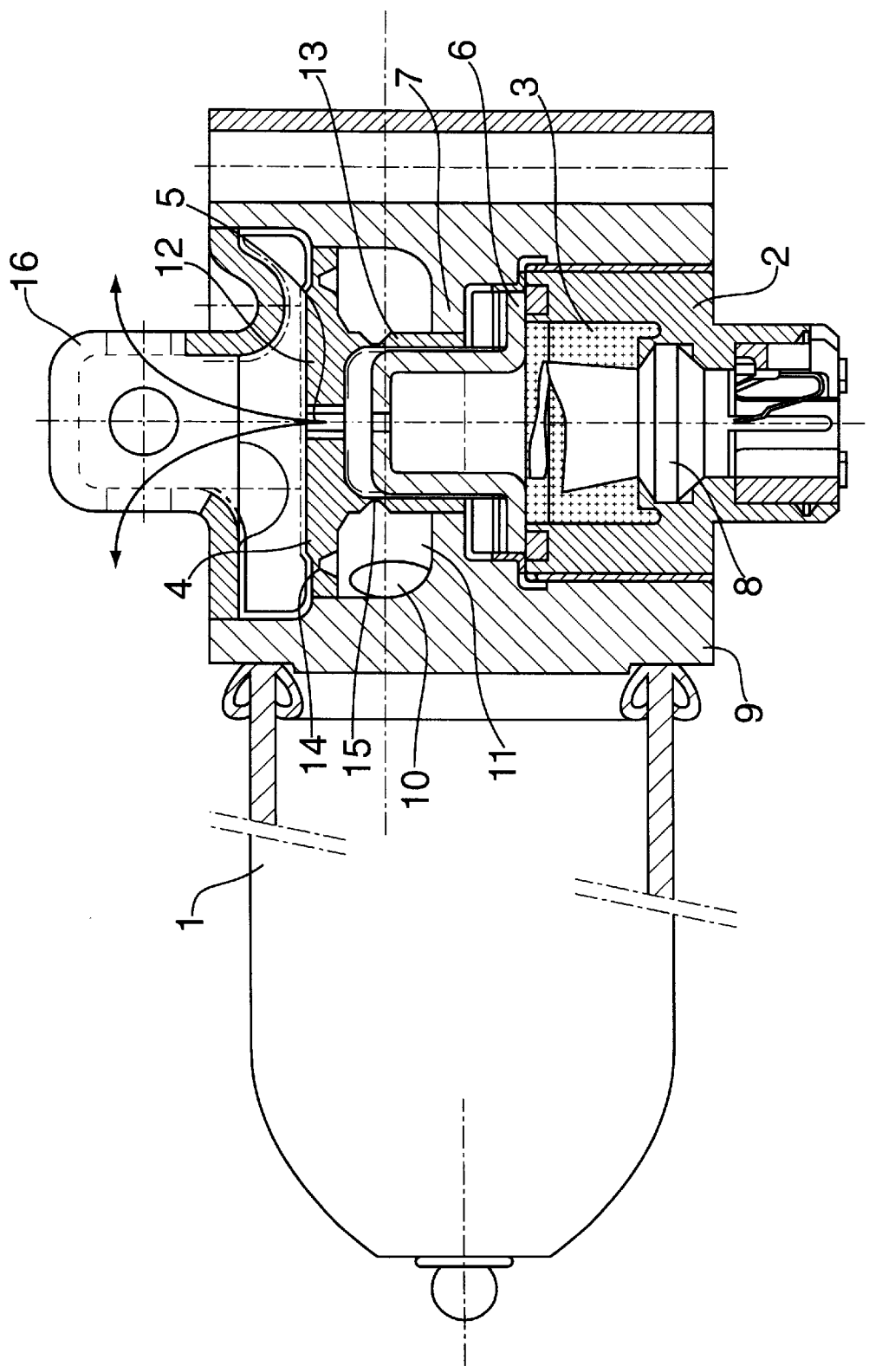

FIG. 1 is a view, partially in section, through an apparatus according to the invention, which differs from the related apparatus known in the state of the art essentially in that the breakaway disk 4 has a central opening 5. The apparatus comprises a compressed-gas tank 1 and a propellant charge container 2 whose pyrotechnical content 3 forms upon ignition a propellant gas which is able, upon the build-up of pressure, to blow off the breakaway disk 4 along the circumferential scoring 14, 15, and thus open the ports 10 between the compressed-gas tank 1 and the airbag (not shown).

The compressed-gas tank 1, propellant charge container 2 and igniter 8 are usually disposed in a common housing which has an abutment 7 to limit the movement of a throttle disk 6 along the central axis when the latter is accelerated by the influence of the propellant gas and causes or assists the breaking of the breakaway disk 5 by a mechanical impact.

The breakaway disk 4 has a cylindrical portion 13 in which the hat-shaped choke disk 6 is guided, and a disk-shaped portion 12 which forms the upper closure of a gas chamber 11 and contains the opening 5 in accord with the invention. The breakaway disk 4 has in the cylindrical portion 13 a circular score 15 and in the disk-shaped portion 12 an annular score 14. The ports 10 form an open connection between the compressed-gas tank 1 and the gas chamber 11 in the housing 9, while the breakaway disk 4 serves as a closure for the compressed-gas tank 1. On the other side the chamber above the propellant charge container 2 is connected through the opening 5 initially with the airbag. This modification of the known apparatus by the invention is possible because the pyrotechnical charge 3 does not require a hermetic closure.

Above the breakaway disk 4 a hat-shaped diffuser 16 is also fastened, which in a known manner serves for the uniform distribution of the gases inflating the airbag and on the other hand serves to catch the broken breakaway disk 4.

What is claimed is:

1. An apparatus for the quick inflation of an airbag, comprising: a compressed-gas tank for supplying compressed gas to an airbag mountable on the device during use; a propellant charge container having pyrotechnical contents which form a propellant gas upon ignition for inflating the airbag; a breakaway disk blocking passage of the compressed gas to the airbag and passage of the propellant gas to the airbag and which is blown off in response to the ignition of the pyrotechnical contents to unblock the passage of gas to the airbag; wherein the breakaway disk has an opening through which the propellant gas can flow into the airbag immediately after the ignition and before the breakaway disk is blown off.

2. The apparatus according to claim 1, further comprising a choke disk between the propellant charge container and the breakaway disk and which is moveable toward the breakaway disk to mechanically break off the breakaway disk.

3. The apparatus according to claim 2, wherein the choke disk has a hat-shaped cross section and with an abutment on a brim end limiting movement of the choke disk toward the breakaway disk.

4. The apparatus according to claim 3, wherein the propellant charge container has an igniter, and wherein the propellant charge container, igniter, breakaway disk and the choke disk are in a common housing, wherein the abutment forms part of the housing, and wherein the compressed-gas tank is fastened to the housing and is connected by at least one port in the housing to a compressed-gas chamber in the housing which is closed hermetically by the breakaway disk.

5. The apparatus according to claim 4, wherein the breakaway disk comprises an integral member having a flat cover portion and a tubular stem and wherein the member is connected to the housing both at a margin of the cover portion and at an end of the stem.

6. The apparatus according to claim 5, wherein the breakaway disk has an annular score in the cover portion and a circular score in the tubular stem.

7. The apparatus according to claim 4, wherein the housing has a gas outlet for the airbag which simultaneously acts as an abutment for the blown off breakaway disk.

8. The apparatus according to claim 1, wherein the opening in the breakaway disk is disposed centrally and wherein the opening is configured to control an initial flow of the propellant gas into the airbag.

* * * * *